United States Patent
Bowles, III et al.

(10) Patent No.: US 6,187,444 B1
(45) Date of Patent: Feb. 13, 2001

(54) PHOTOCHROMIC POLYURETHANE COATING AND ARTICLES HAVING SUCH A COATING

(75) Inventors: Robert J. Bowles, III, Palm Harbor; Nancyanne Gruchacz, Largo, both of FL (US); Shanti Swarup, Allison Park, PA (US); Jeanine A. Conklin, Swissvale, PA (US); Robert W. Walters; Robin Hunt, both of Pittsburgh, PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/083,376

(22) Filed: May 22, 1998

Related U.S. Application Data

(63) Continuation-in-part of application No. 09/017,534, filed on Feb. 2, 1998
(60) Provisional application No. 60/037,428, filed on Feb. 21, 1997, and provisional application No. 60/060,334, filed on Sep. 29, 1997.

(51) Int. Cl.[7] ............................. B32B 27/00; B32B 27/40
(52) U.S. Cl. ..................... 428/423.1; 428/480; 428/500
(58) Field of Search ................................ 428/423.1, 207, 428/217, 220, 213, 500, 210, 480, 332, 339, 913; 359/241; 252/582, 586

(56) References Cited

U.S. PATENT DOCUMENTS

| | | | |
|---|---|---|---|
| 3,361,706 | 1/1968 | Meriwether et al. | 260/39 |
| 3,947,338 | 3/1976 | Jerabek et al. | 204/181 |
| 3,984,299 | 10/1976 | Jerabek | 204/181 |
| 4,442,145 | 4/1984 | Probst et al. | 427/385.5 |
| 4,856,857 * | 8/1989 | Takeuchi et al. | 350/3.6 |
| 4,889,413 | 12/1989 | Ormsby et al. | 350/354 |
| 4,931,220 | 6/1990 | Haynes et al. | 252/586 |
| 5,310,577 * | 5/1994 | Mase et al. | 427/164 |
| 5,323,191 * | 6/1994 | Firtion et al. | 351/159 |
| 5,391,327 * | 2/1995 | Ligas et al. | 252/586 |
| 5,462,806 * | 10/1995 | Konishi et al. | 428/451 |
| 5,496,641 * | 3/1996 | Mase et al. | 428/423.1 |
| 5,552,091 * | 9/1996 | Kumar | 252/586 |
| 5,576,412 | 11/1996 | Hirata et al. | 528/85 |
| 5,595,789 | 1/1997 | Bier | 427/493 |
| 5,645,767 | 7/1997 | Van Gemert | 252/586 |
| 5,658,501 | 8/1997 | Kumar et al. | 252/586 |
| 5,698,141 * | 12/1997 | Kumar | 252/586 |
| 5,770,115 * | 6/1998 | Misura | 252/586 |
| 5,811,503 * | 9/1998 | Herold et al. | 526/323.2 |
| 5,830,578 * | 11/1998 | Ono et al. | 428/446 |

FOREIGN PATENT DOCUMENTS

| | | |
|---|---|---|
| 3201224 | 7/1983 | (DE) . |
| 0 146 136 | 6/1985 | (EP) . |
| 0 294 056 | 12/1988 | (EP) . |
| 0 454 066 | 10/1991 | (EP) . |
| 62-226134 | 10/1987 | (JP) . |
| 3-269507 | 12/1991 | (JP) . |
| 5-28753 | 4/1993 | (JP) . |
| WO 96/11926 | 4/1996 | (WO) . |

OTHER PUBLICATIONS

J.C. Crano, "Chromogenic Materials", *Kirk–Othmer Encyclopedia of Chemical Technology*, 4th . Ed., vol. No. 6, pp. 321–332.

C. D. Eisenbach, "New Aspects of Photochromism in Bulk Polymers", Society of Photographic Scientists and Engineers, 1979.

D. Dieterich and H. Hespe, "Structure–Property–Relationship in Polyurethanes", *Polyurethane Handbook,* 2nd Edition, pp. 37–53 (section 2.5).

"Polyurethanes", *Ullmann's Encyclopedia of Industrial Chemistry,* Fifth, Completely Revised Edition, 1992, vol. A21, pp. 665–716.

"Isocyanates, Organic", *Ullmann's Encyclopedia of Industrial Chemistry,* Fifth, Completely Revised Edition, 1989, vol. A14, pp. 611–625.

* cited by examiner

Primary Examiner—Bruce H. Hess
Assistant Examiner—B. Shewareged
(74) *Attorney, Agent, or Firm*—Frank P. Mallak; Irwin M. Stein

(57) ABSTRACT

Described are photochromic polyurethane coatings that meet commercially acceptable "cosmetic" standards for optical coatings. Also described are articles having such coatings. The coatings exhibit a Fischer microhardness of from 50 to 150 Newtons per mm$^2$ and improved photochromic properties, i.e., the formation of darker activated colors and faster rates of photochromic activation and fade when irradiated with ultraviolet light.

38 Claims, No Drawings

PHOTOCHROMIC POLYURETHANE COATING AND ARTICLES HAVING SUCH A COATING

CROSS REFERENCE TO RELATED APPLICATIONS

This application is a continuation in part of application Ser. No. 09/017,534 filed Feb. 2, 1998, which claims the benefit of U.S. provisional application Ser. No. 60/037,428 filed Feb. 21, 1997, and Ser. No. 60/060,334 filed Sep. 29, 1997.

DESCRIPTION OF THE INVENTION

The present invention relates to photochromic polyurethane coatings and articles having such coatings. More particularly, this invention relates to certain photochromic polyurethane coatings that when applied onto a substrate and exposed to activating light radiation exhibit improved photochromic performance properties. Furthermore, this invention relates to photochromic polyurethane coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The general mechanism responsible for the reversible change in color, i.e., a change in the absorption spectrum in the visible range of light (400–700 nm), exhibited by different types of photochromic compounds has been described and categorized. See John C. Crano, "Chromogenic Materials (Photochromic)", *Kirk-Othmer Encyclopedia of Chemical Technology*, Fourth Edition, 1993, pp. 321–332. The general mechanism for the most common classes of photochromic compounds, e.g., indolino spiropyrans and indolino spirooxazines, involves an electrocyclic mechanism. When exposed to activating radiation, these compounds transform from a colorless closed ring compound into a colored open ring species. In contrast, the colored form of fulgide photochromic compounds is produced by an electrocyclic mechanism involving the transformation of a colorless open ring form into a colored closed ring form.

In the aforedescribed electrocyclic mechanisms, the photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190. One of the main obstacles reported by Claus D. Eisenbach, for the larger commercial application of photochromic systems, is the slow rate of photochromic activation and fade in a solid polymer matrix.

The use of photochromic compounds in polyurethanes has been disclosed. German Democratic Republic Patent No. 116 520 describes a method of preparing photochromic polymer systems which include photochromic ortho-nitrobenzyl compounds added to reaction systems which lead to polyurethanes. European Patent Application Number 0 146 136 describes an optical element with a photochromic coating, such as a polyurethane lacquer in which are incorporated one or more phototropic substances. U.S. Pat. No. 4,889,413 describes a process for producing a polyurethane plastic having photochromic properties. Japanese Patent Application 3-269507 describes a light adjusting plastic lens composed of a plastic base material, a primer layer consisting of a thermosetting polyurethane containing a photochromic substance placed over the base material and a silicone resin hardcoat layer covering the polyurethane layer. Japanese Patent Application 5-28753 describes a coating material with photochromic properties containing urethane products for formation of the coating matrix and organic photochromic compounds.

Although the use of photochromic compounds in polyurethanes has been described in the literature, photochromic polyurethane coated articles that have coating thicknesses necessary to demonstrate good photochromic properties, i.e., to color and fade at acceptable rates and to achieve a dark enough colored state, that meet optical coating "cosmetic" standards required by the industry and the consuming public have not been attained, which may explain why there are no commercial photochromic polyurethane coatings for optical applications, e.g., lenses, currently available.

A photochromic polyurethane coating that has acceptable Fischer microhardness and photochromic properties has now been discovered. This novel coating exhibits a Fischer microhardness of from 50 to 150 Newtons per $mm^2$, and improved photochromic properties, i.e., the formation of darker activated colors and faster rates of photochromic activation and fade when irradiated with ultraviolet light.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-a-vis, glass lenses. Moreover, photochromic transparencies for vehicles, such as cars and airplanes, have been of interest because of the potential safety features that such transparencies offer. Photochromic articles that are most useful are those in which the photochromic compounds exhibit a high activated intensity, a high coloration rate and an acceptable fade rate.

The use of photochromic polyurethane coatings enables the preparation of photochromic plastic articles without the need to incorporate the photochromic compound(s) into the plastic. This is advantageous when the plastic, e.g., thermoplastic polycarbonate, does not have enough internal free volume for the photochromic compounds to function properly. Coating such plastics with the coating composition of the present invention enables preparation of photochromic articles using these plastics. Another advantage that a photochromic coating provides is the more efficient utilization of photochromic compounds when preparing photochromic articles, i.e., avoiding the loss of photochromic compounds associated with transfer methods of incorporating such materials into plastics, e.g., imbibition or permeation.

Other than in the operating examples, or where otherwise indicated, all values, such as those expressing wavelengths, quantities of ingredients, ranges or reaction conditions, used in this description and the accompanying claims are to be understood as modified in all instances by the term "about".

Polyurethanes that may be used to prepare the photochromic polyurethane coating of the present invention are those produced by the catalyzed or uncatalyzed reaction of an organic polyol component and an isocyanate component that when combined to provide a polyurethane composition and when applied as a coating and cured, exhibits a Fischer microhardness in the range of from 50 to 150 Newtons per $mm^2$ and improved photochromic performance properties. The improved photochromic performance properties contemplated herein are a ΔOD of at least 0.15 after 30 seconds and at least 0.44 after 30 minutes, and a Bleach rate of less than 200 seconds—all as measured in the 72° F. (22° C.) Photochromic Performance Test defined in Part D of Example 11 herein. Preferably, the Fischer microhardness is between 70 and 140 Newtons per $mm^2$, the ΔOD is at least 0.17 after 30 seconds and at least 0.45 after 30 minutes, and the Bleach rate is less than 180 seconds. Most preferably, the Fischer microhardness is in the range of from 100 to 130 Newtons per $mm^2$, the ΔOD is at least 0.18 after 30 seconds and at least 0.46 after 30 minutes, and the Bleach rate is less than 150 seconds.

The aforedescribed photochromic performance properties of the polyurethane coating of the present invention are a function of the temperature at which testing is done and the time intervals selected for determination of those properties. For example, photochromic polyurethane coatings within the scope of this invention demonstrate in the 85° F. (29° C.) Photochromic Performance Test defined in Part C of Example 11, a ΔOD of at least 0.12 after 16 seconds and at least 0.30 after five minutes, and a Bleach rate of less than 60 seconds; preferably a ΔOD of at least 0.13 after 16 seconds and at least 0.32 after five minutes, and a Bleach rate of less than 50 seconds; and most preferably, a ΔOD of at least 0.15 after 16 seconds and at least 0.34 after five minutes, and a Bleach rate of less than 40 seconds. In the 95° F. (35° C.) Photochromic Performance Test defined in Part D of Example 11, the photochromic performance properties of the photochromic polyurethane coatings of the present invention are a ΔOD of at least 0.25 after 30 seconds and at least 0.35 after fifteen minutes, and a Bleach rate of less than 45 seconds; preferably a ΔOD of at least 0.27 after 30 seconds and at least 0.38 after fifteen minutes, and a Bleach rate of less than 40 seconds; and most preferably, a ΔOD of at least 0.28 after 30 seconds and at least 0.4 after fifteen minutes, and a Bleach rate of less than 30 seconds.

Polyurethane coatings having a microhardness within the aforestated ranges can be produced by balancing the hard and soft segments comprising the polyurethane. The concept that polyurethanes may be composed of hard and soft segments connected through urethane linkages is known in the art. See "Structure—Property—Relationship in Polyurethanes", *Polyurethane Handbook*, edited by Gunter Oertel, 2nd Ed., Hanser Publishers, 1994, pages 37–53. Typically, the hard segment, i.e., the crystalline or semi-crystalline region of the urethane polymer, results from the reaction of the isocyanate and chain extender, e.g., a short chain polyol such as the low molecular weight polyols defined hereinafter. Generally, the soft segment, i.e., the amorphous, rubbery region of the urethane polymer, results from the reaction of the isocyanate and a polymer backbone component, such as a polyester polyol or polyether polyol.

In addition to the aforedescribed polyols, other polyols, e.g., amide-containing polyols, polyacrylic polyols, epoxy polyols, polyhydric polyvinyl alcohols and urethane polyols, contribute to the hard and/or soft segments when used as polyurethane-forming components. The contribution of a particular organic polyol to either the hard or soft segment when mixed and reacted with other polyurethane-forming components can be readily determined by measuring the Fischer microhardness of the resulting polyurethane coating.

The hard segment-producing organic polyol, as defined herein, is a component that imparts a level of microhardness to the resulting polyurethane coating which increases as the concentration of the hard segment-producing organic polyol increases, vis-a-vis, the soft segment-producing component. The soft segment-producing organic polyol, as defined herein, is a component that imparts a level of microhardness to the polyurethane coating which decreases as the concentration of the soft segment-producing organic polyol increases, vis-a-vis, the hard segment-producing component.

The hard segment-producing organic polyol component includes, but is not limited to, low molecular weight polyols, amide-containing polyols, polyacrylic polyols, epoxy polyols and urethane polyols. Some of the hard segment-producing organic polyols may also contribute to the soft segment, as is known by those skilled in the art. The soft segment-producing organic polyol component includes, but is not limited to, polyester polyols and polyether polyols, e.g. polyoxyalkylenes and poly(oxytetramethylene)diols.

The physical properties of polyurethanes are derived from their molecular structure and are determined by the choice of building blocks, e.g., the choice of the reactants, the ratio of the hard and soft segments, and the supra-molecular structures caused by atomic interactions between chains. Materials and methods for the preparation of polyurethanes are described in *Ullmann's Encyclopedia of Industrial Chemistry*, Fifth Edition, 1992, Vol. A21, pages 665 to 716, which description is herein incorporated by reference.

In the photochromic polyurethane coatings of the present invention, it is believed that the soft segment provides a solubilizing environment for the photochromic compounds to reversibly transform from colorless to colored, while the hard segment provides structural integrity for the coating. A proper balance of these building blocks achieves the benefits of a suitable photochromic polyurethane coating, i.e., a coating having a Fischer microhardness in the range of from 50 to 150 Newtons/mm that also exhibits good photochromic response characteristics.

When polyurethane-forming components, such as organic polyols and isocyanates, are combined to produce polyurethane coatings, the relative amounts of the ingredients are typically expressed as a ratio of the available number of reactive isocyanate groups to the available number of reactive hydroxyl groups, i.e., an equivalent ratio of NCO:OH. For example, a ratio of NCO:OH of 1.0:1.0 is obtained when the weight of one NCO equivalent of the supplied form of the isocyanate component is reacted with the weight of one OH equivalent of the supplied form of the organic polyol component. The formulations of the present invention include an equivalent ratio of NCO:OH ranging between 0.3:1.0 and 3.0:1.0. Preferably, the equivalent ratio of NCO:OH of the photochromic polyurethane coatings of the present invention ranges between 0.9:1.0 and 2.0:1.0, more preferably, between 1.0:1.0 and 1.5:1.0, and most preferably between 1.1:1.0 and 1.3:1.0, e.g., 1.2:1.0.

The isocyanate component of the present invention, as used herein, includes "modified", "unmodified" and mixtures of the "modified" and "unmodified" isocyanate compounds having "free", "blocked" or partially blocked isocyanate groups. The isocyanate may be selected from the group consisting of aliphatic, aromatic, cycloaliphatic and heterocyclic isocyanates, and mixtures of such isocyanates. The term "modified" means that the aforementioned isocyanates are changed in a known manner to introduce biuret, urea, carbodiimide, urethane or isocyanurate groups. In some cases, the "modified" isocyanate is obtained by cycloaddition processes to yield dimers and trimers of the isocyanate, i.e., polyisocyanates. Other methods for modifying isocyanates are described in *Ullmann's Encyclopedia of Industrial Chemistry*, Fifth Edition, 1989, Vol. A14, pages 611 to 625, and in U.S. Pat. No. 4,442,145 column 2, line 63 to column 3, line 31, which disclosures are herein incorporated by reference.

Free isocyanate groups are extremely reactive. In order to control the reactivity of isocyanate group-containing components, the NCO groups may be blocked with certain selected organic compounds that render the isocyanate group inert to reactive hydrogen compounds at room temperature. When heated to elevated temperatures, e.g., between 90 and 200° C., the blocked isocyanates release the blocking agent and react in the same way as the original unblocked or free isocyanate. The isocyanates used to prepare the coatings of the present invention can be fully blocked, as described in U.S. Pat. No. 3,984,299, column 1, line 57 through column 3, line 15, or partially blocked and reacted with the polymer backbone, as described in U.S. Pat. No. 3,947,338, column 2, line 65 to column 4, line 30, which disclosures are incorporated herein by reference.

As used herein, the NCO in the NCO:OH ratio represents the free isocyanate of free isocyanate-containing compounds, and of blocked or partially blocked isocyanate-containing compounds after the release of the blocking agent. In some cases, it is not possible to remove all of the blocking agent. In those situations, more of the blocked isocyanate-containing compound would be used to attain the desired level of free NCO.

The isocyanate component of the polyurethane coatings of the present invention may also include the polyiso(thio)cyanate compounds disclosed in U.S. Pat. No. 5,576,412. The disclosure relating to such polyiso(thio)cyanate compounds is herein incorporated by reference.

Preferably, the isocyanate component is selected from the group of isocyanate-containing compounds consisting of aliphatic isocyanates, cycloaliphatic isocyanates, blocked aliphatic isocyanates, blocked cycloaliphatic isocyanates and mixtures of such isocyanates. More preferably, the isocyanate component is selected from the group consisting of blocked aliphatic isocyanates, blocked cycloaliphatic isocyanates and mixtures thereof. Most preferably, the isocyanate component is a blocked aliphatic isocyanate that includes the isocyanurate group, e.g., a blocked isocyanate component comprising blocked isocyanurates of isophorone diisocyanate.

Generally, compounds used to block the isocyanates are organic compounds that have active hydrogen atoms, e.g., volatile alcohols, epsilon-caprolactam or ketoxime compounds. More specifically, the blocking compounds may be selected from the group consisting of phenol, cresol, nonylphenol, epsilon-caprolactam and methyl ethyl ketoxime. Preferably, the blocking compound is methyl ethyl ketoxime.

Suitable isocyanate components include modified or unmodified members having free, blocked or partially blocked isocyanate-containing components of the group consisting of: toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis (isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4,-diisocyanate and mixtures thereof. Preferably, the aforedescribed isocyanate component is selected from the group consisting of hexamethylene-1,6-diisocyanate; isophorone diisocyanate; ethylene diisocyanate; dodecane-1,12-diisocyanate; and cyclohexane-1,3-diisocyanate and mixtures thereof; and more preferably, hexamethylene-1,6-diisocyanate, isophorone diisocyanate, ethylene diisocyanate and mixtures thereof.

The optional catalyst of the present invention may be selected from the group consisting of Lewis bases, Lewis acids and insertion catalysts described in *Ullmann's Encyclopedia of Industrial Chemistry*, 5th Edition, 1992, Volume A21, pp. 673 to 674, which description is herein incorporated by reference. Preferably, the catalyst is selected from the group consisting of tin octylate, dibutyltin diacetate, dibutyltin dilaurate, dibutyltin mercaptide, dibutyltin dimaleate, dimethyltin diacetate, dimethyltin dilaurate, dimethyltin mercaptide, dimethyltin dimaleate, triphenyltin acetate, triphenyltin hydroxide, 1,4-diazabicyclo[2.2.2] octane, triethylamine and mixtures thereof. More preferably, the catalyst is selected from the group consisting of 1,4-diazabicyclo[2.2.2]octane, dibutyltin diacetate, dibutyltin dilaurate and mixtures thereof.

The organic polyol, i.e., diol, triol, etc., component(s) used to prepare the coating composition of the present invention are polyols that react with an isocyanate component to produce a polyurethane. The polyurethane coating of the present invention is produced by balancing the hard and soft segments comprising the polyurethane. By producing coatings in which the ratio of the equivalents of the hard segment-producing polyol to the soft segment-producing polyol is varied, one of ordinary skill in the art can determine readily the Fischer microhardness of the resulting coatings and identify which combination of hard segment and soft segment polyols yields a coating with a Fischer microhardness in the range of from 50 to 150 Newtons per mm$^2$. In a similar manner, one may identify which combinations of hard segment and soft segment polyols yields a coating that demonstrates the requisite photochromic performance properties. It is contemplated that the organic polyol component may be a single polyol composed itself of sections of hard and soft segment-producing polyols.

Preferably, the organic polyol component comprises hard segment-producing polyols selected from the group consisting of polyacrylic polyols, low-molecular weight polyols and mixtures thereof that contribute from 10 to 90 weight percent of the hydroxyl groups that react with the isocyanate groups, and soft segment-producing polyols, i.e., polyols other than the hard segment-producing polyols, that contribute from 90 to 10 weight percent of the hydroxyl groups that react with the isocyanate groups. Stated otherwise, the weight ratio of hard segment-producing polyols to soft segment-producing polyols is from 10:90 to 90:10. More preferably, the hard segment-producing polyol ranges from 40 to 75 weight percent and the soft segment-producing polyol is selected from the group consisting of polyester polyols, polyether polyols and mixtures thereof that range from 25 to 60 weight percent. Most preferably, the weight of the hard segment-producing polyol ranges from 45 to 70 percent; that of the soft segment-producing polyol is from 30 to 55 percent; the hard segment-producing polyol is a polyacrylic polyol that is a copolymer of hydroxy-functional ethylenically unsaturated (meth)acrylic monomers and other ethylenically unsaturated monomers, an ethoxylated trimethylolpropane having a number average molecular weight less than 500 or a mixture thereof; and the soft segment-producing polyol is a polyol component other than polyacrylic polyol, e.g., a polyether. When only one organic polyol is used to provide the hard and soft segment, the same ratios apply to the hard and soft segment-producing sections of that polyol.

Combinations of certain hard segment-producing and soft segment-producing polyols within the aforedescribed weight ratio ranges may be used to produce photochromic polyurethane coatings which exhibit acceptable Fischer microhardness levels and unacceptable photochromic performance properties and vice versa.

Examples of organic polyols that may be used in the present invention include (a) low molecular weight polyols, i.e., polyols having a weight average molecular weight or number average molecular weight less than 500, e.g., aliphatic diols, such as $C_2$–$C_{10}$ aliphatic diols, triols, polyhydric alcohols and alkoxylated low molecular weight polyols; (b) polyester polyols; (c) polyether polyols; (d) amide-containing polyols; (e) polyacrylic polyols; (f) epoxy polyols; (g) polyhydric polyvinyl alcohols; (h) urethane polyols and (i) mixtures of such polyols. Preferably, the organic polyols are selected from the group consisting of low molecular weight polyols, polyacrylic polyols, polyether polyols, polyester polyols and mixtures thereof. More preferably, the organic polyols are selected from the group consisting of low molecular weight polyols, polyacrylic polyols, polyether polyols, and mixtures thereof, and most preferably, polyacrylic polyols, polyether polyols and mixtures thereof.

Examples of low molecular weight polyols that can be used to prepare the polyurethane used in the coating composition of the present invention include: tetramethylolmethane, i.e., pentaerythritol; trimethylolethane; trimethylolpropane; di-(trimethylolpropane) dimethylol propionic acid; ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6 hexanediol; 2,5-hexanediol; 2-methyl-1,3 pentanediol; 2,4-heptanediol; 2-ethyl-1,3-hexanediol; 2,2-dimethyl-1,3-propanediol; 1,4—Cyclohexanediol; 2,2-dimethyl-3-hydroxypropyl-2,2-dimethyl-3-hydroxypropionate; diethylene glycol; triethylene glycol; tetracthylene glycol; dipropylene glycol; tripropylene glycol; 1,4—Cyclohexanedimethanol; 1,2-bis(hydroxymethyl) cyclohexane; 1,2-bis(hydroxyethyl)-cyclohexane; bishydroxypropyl hydantoins; tris hydroxyethyl isocyanurate; the alkoxylation product of 1 mole of 2,2-bis(4 -hydroxyphenyl) propane (i.e., bisphenol-A) and 2 moles of propylene oxide; and the like, e.g., ethoxylated or propoxylated trimethylolpropane or pentaerythritol having a number average molecular weight less than 500.

Polyester polyols are generally known and can have a number average molecular weight in the range of from 500 to 10,000. They are prepared by conventional techniques utilizing low molecular weight diols, triols and polyhydric alcohols known in the art, including but not limited to the previously described low molecular weight polyols (optionally in combination with monohydric alcohols) with polycarboxylic acids. Examples of suitable polycarboxylic acids include: phthalic acid, isophthalic acid, terephthalic acid, trimellitic acid, tetrahydrophthalic acid, adipic acid, succinic acid, glutaric acid, fumaric acid, and mixtures thereof. Anhydrides of the above acids, where they exist, can also be employed and are encompassed by the term "polycarboxylic acid". In addition, certain materials which react in a manner similar to acids to form polyester polyols are also useful. Such materials include lactones, e.g., caprolactone, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polyether polyols are generally known and can have a number average molecular weight in the range of from 500 to 10,000. Examples of polyether polyols include various polyoxyalkylene polyols, polyalkoxylated polyols having a number average molecular weight greater than 500, e.g., poly(oxytetramethylene)diols, and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, and the halogenated alkylene oxides such as trichlorobutylene oxide and so forth. The more preferred alkylene oxides include propylene oxide and ethylene oxide or a mixture thereof using random or step-wise oxyalkylation. Examples of such polyoxyalkylene polyols include polyoxyethylene, i.e., polyethylene glycol, polyoxypropylene, i.e., polypropylene glycol. The number average molecular of such polyoxyalkylene polyols used as the soft segment is preferably equal to or greater than 600, more preferably, equal to or greater than 725, and most preferably, equal to or greater than 1000.

Polyalkoxylated polyols having a number average molecular weight greater than 500 may be represented by the following general formula I,

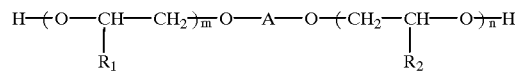

wherein m and n are each a positive number, the sum of m and n being from 5 to 70, $R_1$ and $R_2$ are each hydrogen, methyl or ethyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by the following general formula II,

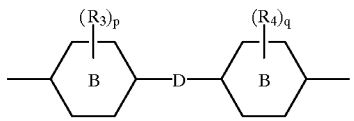

wherein $R_3$ and $R_4$ are each $C_1$–$C_4$ alkyl, chlorine or bromine, p and q are each an integer from 0 to 4,

represents a divalent benzene group or a divalent cyclohexane group, and D is O, S, —S(O$_2$)—, —C(O)—, —CH$_2$—, —CH=CH—, —C(CH$_3$)$_2$—, —C(CH$_3$)(C$_6$H$_5$)— or

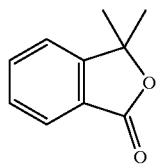

when

is the divalent benzene group, and D is O, S, —CH$_2$—, or —C(CH$_3$)$_2$— when

is the divalent cyclohexane group. Preferably, the polyalkoxylated polyol is one wherein the sum of m and n is from 15 to 40, e.g., 25 to 35, $R_1$ and $R_2$ are each hydrogen, and A is a divalent linking group according to general formula II wherein

represents a divalent benzene group, p and are each 0, and D is —C(CH$_3$)$_2$—, and most preferably, the sum of m and n is from 25 to 35, e.g., 30. Such materials may be prepared by methods which are well known in the art. One such commonly used method involves reacting a polyol, e.g., 4,4'-isopropylidenediphenol, with an oxirane containing substance, for example ethylene oxide, propylene oxide, a-butylene oxide or β-butylene oxide, to form what is commonly referred to as an ethoxylated, propoxylated or butoxylated polyol having hydroxy functionality.

Examples of polyols suitable for use in preparing the polyalkoxylated polyols include the low molecular weight polyols described herein, e.g., trimethylolpropane and pentaerythritol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,41-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol)methane.

The polyether polyols also include the generally known poly(oxytetramethylene)diols prepared by the polymerization of tetrahydrofuran in the presence of Lewis acid catalysts such as boron trifluoride, tin (IV) chloride and sulfonyl chloride. The number average molecular weight of poly(oxytetramethylene)diols used as the soft segment ranges from 500 to 5000, preferably from 650 to 2900, more preferably from 1000 to 2000, and most preferably is 1000.

Preferably, the polyether polyols are selected from the group consisting of polyoxyalkylene polyols, polyalkoxylated polyols, poly(oxytetramethylene)diols and mixtures thereof, and most preferably, polyoxyalkylene polyols having a number average molecular weight of equal to or greater than 1,000, ethoxylated Bisphenol A having approximately 30 ethoxy groups and poly(oxytetramethylene) diols having a number average molecular weight of 1000.

Amide-containing polyols are generally known and typically are prepared from the reaction of diacids or lactones and low molecular weight polyols described herein with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Epoxy polyols are generally known and can be prepared, for example, by the reaction of glycidyl ethers of polyphenols such as the diglycidyl ether of 2,2-bis(4-hydroxyphenyl)propane, with polyphenols such as 2,2-bis(4-hydroxyphenyl)propane. Epoxy polyols of varying molecular weights and average hydroxyl functionality can be prepared depending upon the ratio of starting materials used.

Polyhydric polyvinyl alcohols are generally known and can be prepared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

Urethane polyols are generally known and can be prepared, for example, by reaction of a polyisocyanate with excess organic polyol to form a hydroxyl functional product. Examples of polyisocyanates useful in the preparation of urethane polyols include those described herein. Examples of organic polyols useful in the preparation of urethane polyols include the other polyols described herein, e.g., low molecular weight polyols, polyester polyols, polyether polyols, amide-containing polyols, polyacrylic polyols, epoxy polyols, polyhydric polyvinyl alcohols and mixtures thereof.

The polyacrylic polyols are generally known and can be prepared by free-radical addition polymerization techniques of monomers described hereinafter. Preferably said polyacrylic polyols have a weight average molecular weight of from 500 to 50,000 and a hydroxyl number of from 20 to 270. More preferably, the weight average molecular weight is from 1000 to 30,000 and the hydroxyl number is from 80 to 250. Most preferably, the average molecular weight is from 3,000 to 20,000 and the hydroxyl number is from 100 to 225.

Polyacrylic polyols include, but are not limited to, the known hydroxyl-functional addition polymers and copolymers of acrylic and methacrylic acids; their ester derivatives including, but not limited to, their hydroxyl-functional ester derivatives. Examples of hydroxy-functional ethylenically unsaturated monomers to be used in the preparation of the hydroxy-functional addition polymers include hydroxyethyl (meth)acrylate, i.e., hydroxyethyl acrylate and hydroxyethyl methacrylate, hydroxypropyl (meth)acrylate, hydroxybutyl (meth)acrylate, hydroxymethylethyl acrylate, hydroxymethylpropyl acrylate and mixtures thereof.

More preferably, the polyacrylic polyol is a copolymer of hydroxy-functional ethylenically unsaturated (meth)acrylic monomers and other ethylenically unsaturated monomers selected from the group consisting of vinyl aromatic monomers, e.g., styrene, a-methyl styrene, t-butyl styrene and vinyl toluene; vinyl aliphatic monomers such as ethylene, propylene and 1,3-butadiene; (meth)acrylamide; (meth)acrylonitrile; vinyl and vinylidene halides, e.g., vinyl chloride and vinylidene chloride; vinyl esters, e.g., vinyl acetate; alkyl esters of acrylic and methacrylic acids, i.e. alkyl esters of (meth)acrylic acids, having from 1 to 17 carbon atoms in the alkyl group, including methyl (meth)acrylate, ethyl (meth)acrylate, butyl (meth)acrylate, cyclohexyl (meth)acrylate, 2-ethylhexyl (meth)acrylate, isobornyl (meth)acrylate and lauryl (meth)acrylate; epoxy-functional ethylenically unsaturated monomers such as glycidyl (meth)acrylate; carboxy-functional ethylenically unsaturated monomers such as acrylic and methacrylic acids and mixtures of such ethylenically unsaturated monomers.

The hydroxy-functional ethylenically unsaturated (meth) acrylic monomer(s) may comprise up to 95 weight percent of the polyacrylic polyol copolymer. Preferably it composes up to 70 weight percent, and more preferably, the hydroxy-functional ethylenically unsaturated (meth)acrylic monomer(s) comprises up to 45 weight percent of the total copolymer.

The polyacrylic polyols described herein can be prepared by free radical initiated addition polymerization of the monomer(s), and by organic solution polymerization techniques. The monomers are typically dissolved in an organic solvent or mixture of solvents including ketones such as methyl ethyl ketones, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 70 to 160° C., and the monomer or a mixture of monomers and free radical initiator is slowly added to the refluxing solvent, over a period of about 1 to 7 hours. Adding the monomers too quickly may cause poor conversion or a high and rapid exothermic reaction, which is a safety hazard. Suitable free radical initiators include t-amyl peroxyacetate, di-t-amyl peroxyacetate and 2,2'-azobis (2-methylbutanenitrile). The free radical initiator is typically present in the reaction mixture at from 1 to 10 percent, based on total weight of the monomers. The polymer prepared by the procedures described herein is non-gelled and preferably has a weight average molecular weight of from 500 to 50,000 grams per mole.

Photochromic compounds that may be utilized with the polyurethane coating compositions of the present invention are organic photochromic compounds that color to a desired hue. They typically have at least one activated absorption maxima within the range of between about 400 and 700 nanometers. They may be used individually or may be used in combination with photochromic compounds that complement their activated color. Further, the photochromic compounds may be incorporated, e.g., dissolved or dispersed, in the polyurethane coating composition, which is used to prepare photochromic articles.

More particularly, the organic photochromic material comprises:

(a) at least one photochromic organic compound having a visible lambda max of from 400 nanometers to 525 nanometers; and (b) at least one photochromic organic compound having a visible lambda max of from greater than 525 nanometers to 700 nanometers. Most particularly, the organic photochromic compounds are naphtho[1,2-b]pyrans.

Examples of suitable photochromic compounds for use in the polymerizable composition of the present invention include benzopyrans, naphthopyrans, e.g., naphtho[1,2-b] pyrans and naphtho[2,1-b]pyrans, phenanthropyrans, indenonaphthopyrans, e.g., the indeno-fused naphthopyrans of U.S. Pat. No. 5,645,767, spiro(indoline)benzoxazines and naphthoxazines, spiro(indoline)pyridobenzoxazines, spiro (benzindoline)pyridobenzoxazines and spiro(benzindoline) naphthoxazines. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are the photochromic organo-metal dithizonates, e.g., mercury dithizonates which are described in, for example, U.S. Pat. No. 3,361,706; and fulgides and fulgimides, e.g. the 3-furyl and 3-thienyl fulgides and fulgimides, which are described in U.S. Pat. No. 4,931,220 at column 20, line 5 through column 21, line 38.

The disclosures relating to such photochromic compounds in the aforedescribed patents are incorporated herein, in toto, by reference. The photochromic articles of the present invention may contain one photochromic compound or a mixture of photochromic compounds, as desired in the coating. Mixtures of photochromic compounds may be used to attain certain activated colors such as a near neutral gray or brown.

A neutral gray color exhibits a spectrum that has relatively equal absorption in the visible range between 400 and 700 nanometers. A neutral brown color exhibits a spectrum in which the absorption in the 400–550 nanometer range is moderately larger than in the 550–700 nanometer range. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., x=X/(X+Y+Z) and y=Y/(X+Y+Z). Color as described in the CIE system can be plotted on a chromaticity diagram, usually a plot of the chromaticity coordinates x and y. See pages 47–52 of *Principles of Color Technology*, by F. W. Billmeyer, Jr., and Max Saltzman, Second Edition, John Wiley and Sons, N.Y. (1981). As used herein, a near neutral color is one in which the chromaticity coordinate values of "x" and "y" for the color are within the following ranges (D65 illuminant): x=0.260 to 0.400, y=0.280 to 0.400 following activation to 40 percent luminous transmission by exposure to solar radiation (Air Mass 1 or 2).

The photochromic compounds described herein are used in photochromic amounts and in a ratio (when mixtures are used) such that a coating composition to which the compound(s) is applied or in which it is incorporated exhibits a desired resultant color, e.g., a substantially neutral color such as shades of gray or brown when activated with unfiltered sunlight, i.e., as near a neutral color as possible given the colors of the activated photochromic compounds, and exhibits the desired intensity, as measured by the change in optical density ($\Delta$OD), e.g., a $\Delta$OD of 0.4 or more when tested at 95° F. after 15 minutes of activation using the 95° F. Photochromic Performance Test described in Part D of Example 10.

Generally, the amount of photochromic material incorporated into the coating composition ranges from 0.1 to 40 weight percent based on the weight of the liquid coating composition. Preferably, the concentration of photochromic material ranges from 1.0 to 30 weight percent, more preferably, from 3 to 20 weight percent, and most preferably, from 5 to 15 weight percent, e.g., from 7 to 14 weight percent, based on the weight of the liquid coating composition.

The photochromic compound(s) described herein may be incorporated into the coating composition by dissolving or dispersing the photochromic substance within the organic polyol component or the isocyanate component, or by adding it to a mixture of the polyurethane-forming components. Alternatively, the photochromic compounds may be incorporated into the cured coating by imbibition, permeation or other transfer methods is known by those skilled in the art.

Compatible (chemically and color-wise) tints, i.e., dyes, may be added to the coating composition, applied to the coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substances is in an unactivated state.

Adjuvant materials may also be incorporated into the coating composition with the photochromic material used, prior to, simultaneously with or subsequent to application or incorporation of the photochromic material in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), asymmetric diaryloxalamide (oxanilide) compounds and singlet oxygen quenchers, e.g., a nickel ion complex with an organic ligand, or mixtures of stabilizers are contemplated. They may be used alone or in combination. Such stabilizers are described in U.S. Pat. Nos. 4,720,356 and 5,391,327, respectively.

The photochromic polyurethane coating composition of the present invention may further comprise additional conventional ingredients which impart desired characteristics to the composition, or which are required for the process used to apply and cure the composition to the substrate or which enhance the cured coating made therefrom. For example, plasticizers may be used to adjust the Fischer microhardness and/or photochromic performance properties of a photochromic polyurethane coating composition that produced a cured coating having results for such properties outside of the desired range. Other such additional ingredients comprise rheology control agents, leveling agents, e.g., surfactants, initiators, cure-inhibiting agents, free radical scavengers and adhesion promoting agents, such as trialkoxysilanes preferably having an alkoxy substituent of 1 to 4 carbon atoms, including $\gamma$-glycidoxypropyltrimethoxysilane, $\gamma$-aminopropyltrimethoxysilane, 3,4-epoxycyclohexylethyltrimethoxysilane and aminoethyltrimethoxysilane.

The coating compositions used in accordance with the invention may be applied to substrates, i.e., materials to which the coating composition is applied, of any type such as, for example paper, glass, ceramics, wood, masonry, textiles, metals and organic polymeric materials.

Preferably, the substrate is an organic polymeric material, particularly, thermoset and thermoplastic organic polymeric materials, e.g., thermoplastic polycarbonate type polymers and copolymers, and homopolymers or copolymers of a polyol(allyl carbonate), used as organic optical materials.

The amount of the coating composition applied to the substrate is an amount necessary to incorporate a sufficient quantity of the organic photochromic compound(s) to produce a coating that exhibits the required change in optical density ($\Delta$OD) when the cured coating is exposed to UV radiation. Particularly, the amount of photochromic polyurethane coating composition applied to the substrate is that amount which, when tested in the 72° F. (22° C.) Photochromic Performance Test produces a $\Delta$OD of at least 0.15 after 30 seconds and at least 0.44 after 30 minutes and a Bleach rate of less than 200 seconds using the procedure described in Part D of Example 11. The cured coating may have a thickness of from 5 to 200 microns. Preferably, the coating thickness is from 5 to 100 microns, more preferably, 10 to 40 microns, e.g., 20 microns, and most preferably from greater than 10 to 25 microns, e.g., 15 microns.

If required and if appropriate, it is typical to clean the surface of the substrate to be coated prior to applying the coating composition of the present invention for the purposes of promoting adhesion of the coating. Effective treatment techniques for plastics, such as those prepared from diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of organic polymeric materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively. In addition, depending on the intended use of the coated article, it may be necessary to apply an appropriate protective coating(s), i.e., an abrasion resistant coating and/or coatings that serve as oxygen barriers, onto the exposed surface of the coating composition to prevent scratches from the effects of friction and abrasion and interactions of oxygen with the photochromic compounds, respectively. In some cases, the primer and protective coatings are interchangeable, i.e., the same coating may be used as the primer and the protective coating(s). Other coatings or surface treatments, e.g., a tintable coating, antireflective surface, etc.,, may also be applied to the cured coating of the present invention.

The coating composition of the present invention may be applied using the same methods described herein for applying the primer and the protective coating(s) or other methods known in the art can be used. Preferably, the coating composition is applied by spin coating, dip coating or spray coating methods, and most preferably, by spin coating methods.

Following application of the coating composition to the treated surface of the substrate, the coating is cured. Depending on the isocyanate component selected, i.e., free, blocked or partially blocked, the coating may be cured at temperatures ranging from 22° C. to 200° C. If heating is required to obtain a cured coating, temperatures of between 80° C. and a temperature above which the substrate is damaged due to heating, e.g., 80° C. to 150° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the photochromic polyurethane coating composition include irradiating the coating with infrared, ultraviolet, gamma or electron radiation so as to initiate the polymerization reaction of the polymerizable components in the coating. This may be followed by a heating step.

In accordance with the present invention, the cured polyurethane coating meets commercially acceptable "cosmetic" standards for optical coatings. Examples of cosmetic defects found in optical coatings include pits, spots, inclusions, cracks and crazing of the coating. Preferably, the coatings prepared using the photochromic polyurethane coating composition of the present invention are substantially free of cosmetic defects.

Examples of organic polymeric materials that may be substrates for the coating composition of the present invention are polymers prepared from individual monomers or mixtures of monomers selected from the following groups:

(a) diacrylate or dimethacrylate compounds represented by graphic formula III:

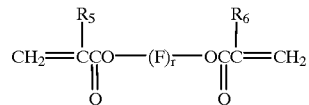

III wherein $R_5$ and $R_6$ may be the same or different and are hydrogen or methyl, F is methylene ($CH_2$) and r is an integer of from 1 to 20;

(b) diacrylate or dimethacrylate compounds represented by graphic formula IV:

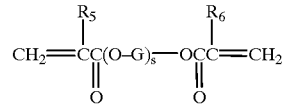

IV wherein G is a straight or branched chain alkylene containing from 2 to 4 carbon atoms and s is an integer of from 1 to 50; and (c) an acrylate or a methacrylate compound having an epoxy group represented by graphic formula V:

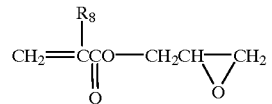

V wherein $R_8$ is hydrogen or methyl.

In graphic formulae III, IV and V, like letters used with respect to the definitions of substituents have the same meaning.

Examples of diacrylate or dimethacrylate compounds represented by graphic formulae III and IV include diethylene glycol dimethacrylate, triethylene glycol dimethacrylate, etc., butanediol dimethacrylate and poly (oxyalkylene dimethacrylates), e.g., polyethylene glycol (600) dimethacrylate. Examples of acrylate or methacrylate compounds represented by graphic formula V include glycidyl acrylate and glycidyl methacrylate.

Further examples of organic polymeric materials, e.g., organic optical resins, which may be coated with the polymerizable compositions described herein include: polymers, i.e., homopolymers and copolymers, of the monomers and mixtures of monomers disclosed in U.S. Pat. No. 5,658,501 from column 15, line 28 to column 16, line 17. Examples of such monomers and polymers include: bis(allyl carbonate) monomers, e.g., diethylene glycol bis(allyl carbonate), which monomer is sold under the trademark CR-39; polyol (meth)acryloyl terminated carbonate monomer; ethoxylated bisphenol A dimethacrylate monomers; ethylene glycol bismethacrylate monomers; poly(ethylene glycol)bis methacrylate monomers; urethane acrylate monomers; styrene; cellulose acetate; cellulose triacetate; cellulose acetate propionate and butyrate; poly(vinyl acetate); poly(vinyl alcohol); poly(vinyl chloride); poly(vinylidene chloride); polyurethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS.

More particularly contemplated, is the use of optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from 1.48 to 1.75, e.g., from 1.495 to 1.66, particularly from 1.5 to 1.6. Specifically contemplated are optical elements made of thermoplastic polycarbonates.

Most particularly contemplated, is the use of a combination of the photochromic polyurethane coating composition of the present invention with optical elements to produce photochromic optical articles. Such articles are prepared by sequentially applying to the optical element a primer, the photochromic polyurethane composition of the present invention and appropriate protective coating(s). The resulting cured coating meets commercially acceptable "cosmetic" standards for optical coatings, and preferably, is substantially free of cosmetic defects.

The present invention is more particularly described in the following examples, which are intended as illustrative only, since numerous modifications and variations therein will be apparent to those skilled in the art. Identically numbered footnotes in the tables found in the examples refer to identical substances.

EXAMPLE 1

Composition A

The following materials were added in the order and manner described to a suitable reaction vessel equipped with an agitator, a reflux column, an addition funnel, nitrogen inlet, an internal temperature probe connected to an external

| Material | Weight (grams) |
| --- | --- |
| Charge-1 | |
| AROMATIC 100 solvent[1] | 200 |
| Charge-2 | |
| Hydroxyethyl methacrylate | 180 |
| Butyl acrylate | 300 |

-continued

| Material | Weight (grams) |
| --- | --- |
| Styrene | 120 |
| Charge-3 | |
| AROMATIC 100 solvent[1] | 116 |
| LUPERSOL 555-M60 initiator[2] | 22.5 |

[1]Mixture of high temperature boiling solvents available from Texaco.
[2]Tertiary amyl peracetate available from Elf Atochem.

Charge-1 was added to the reaction vessel; nitrogen was introduced into the vessel; the agitator was turned on; and heat was applied to the charge in the reaction vessel. When the charge reached a temperature of 125° C., Charge-3 was added in a continuous manner over a period of 3.5 hours. Fifteen minutes after initiating the addition of Charge-3, Charge-2 was added in a continuous manner over a period of 3 hours. Upon completing the addition of Charge-3, the reaction mixture was held at 125° C. for one hour. The contents of the reaction vessel were then cooled and transferred to a suitable container. The resulting polymer solution had a calculated total solids content, based on total solution weight, of about 65 percent. The polymer had a weight average molecular weight, as measured by gel permeation chromatography using polystyrene as a standard, of about 13,500 and a hydroxyl value of about 129, based on polymer solids.

Composition B

The procedure for preparing Composition A was followed except that the amount of LUPERSOL 555-M60 initiator was 43 grams. The resulting polymer solution had a theoretical total solids content, based on total solution weight, of about 65 percent. The polymer had a weight average molecular weight, as measured by gel permeation chromatography using polystyrene as a standard, of about 7,600 and a hydroxyl value of about 127, based on polymer solids.

Composition C

The procedure for preparing Composition A was followed except that the amount of LUPERSOL 555-M60 initiator was 90 grams. The resulting polymer solution had a theoretical total solids content, based on total solution weight, of about 65 percent. The polymer had a weight average molecular weight, as measured by gel permeation chromatography using polystyrene as a standard, of about 2,900 and a hydroxyl value of about 119, based on polymer solids.

Composition D

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
| --- | --- |
| Charge-1 | |
| SOLVESSO 100 solvent[3] | 120 |
| Xylene | 120 |
| Isobutanol | 48 |

-continued

| Material | Weight (grams) |
|---|---|
| Charge-2 | |
| Hydroxypropyl acrylate | 448 |
| Butyl acrylate | 212.8 |
| Butyl methacrylate | 207.2 |
| Styrene | 224.0 |
| Acrylic acid | 22.4 |
| Methyl methacrylate | 5.6 |
| Tertiary dodecyl mercaptan | 11.2 |
| Charge-3 | |
| Xylene | 96 |
| SOLVESSO 100 solvent[3] | 72 |
| VAZO-67 initiator[4] | 56 |
| Charge-4 | |
| SOLVESSO 100 solvent[3] | 12 |
| VAZO-67 initiator[4] | 4.5 |
| Charge-5 | |
| SOLVESSO 100 solvent[3] | 12 |
| VAZO-67 initiator[4] | 4.5 |

[3]Aromatic solvent available from Exxon.
[4]2,2'-azobis-(2-methylbutyronitrile) available from E.I. duPont de Nemours and Company.

Charge-1 was added to the reaction vessel; nitrogen was introduced into the vessel, and with the agitator running heat was applied to the reaction vessel to maintain a temperature at which reflux of the solvent occurred. After reaching the reflux temperature, Charges-2 and -3 were added separately to the reaction vessel in a continuous manner over a period of 2 hours. Subsequently, Charge-4 was added and the reaction mixture was held for 1 hour at the reflux temperature. Charge-5 was then added and the reaction mixture was held an additional 1.5 hours at the reflux temperature. The contents of the reaction vessel were then cooled and transferred to a suitable container. The resulting polymer solution had a calculated total solids content, based on total solution weight, of about 70.7 percent. The polymer had a weight average molecular weight, as measured by gel permeation chromatography using polystyrene as a standard, of about 9,000 and a hydroxyl value of about 170, based on polymer solids.

EXAMPLE 2

The following materials were added in the order and the manner described to a container suitable for use with a BRINKMAN PT-3000 homogenizer:

| Material | Weight (grams) |
|---|---|
| Charge-1 | |
| Photochromic No. 1[5] | 0.673 |
| Photochromic No. 2[6] | 0.449 |
| TINUVIN 292 UV stabilizer[7] | 0.546 |
| BAYSILONE paint additive PL[8] | 0.015 |
| Tin catalyst[9] | 0.103 |
| NMP[10] | 3.163 |
| Charge-2 | |
| Polyacrylic Polyol of Composition A | 5.66 |
| QO POLYMEG 1000 diol[11] | 2.25 |

-continued

| Material | Weight (grams) |
|---|---|
| Charge-3 | |
| VESTANAT B1358 A blocked polyisocyanate[12] | 8.098 |

[5]A naphtho[1,2-b]pyran that exhibits a blue color when irradiated with ultraviolet light.
[6]A naphtho[1,2-b]pyran that exhibits a red-orange color when irradiated with ultraviolet light.
[7]Hindered amine ultraviolet light stabilizer (CAS registry No. 41556-26-7) available from CIBA-GEIGY Corp.
[8]Phenyl methyl polysiloxane available from Bayer Corporation.
[9]Dibutyltin dilaurate available as DABCO T-12 catalyst or METACURE T-12 catalyst.
[10]N-methyl pyrrolidone solvent of 99 percent purity.
[11]Poly(oxytetramethylene)diol having a number average molecular weight of 1000 which is available from Great Lakes Chemical Corporation.
[12]A methyl ethyl ketoxime blocked, aliphatic polyisocyanate available from Huls America Inc.

Charge-1 was added to the container and mixed by the homogenizer at a speed of 5000 rpm for 2 minutes. Charge-2 was then added to the container and mixed for an additional 2 minutes at 5000 rpm. The resulting solution was transferred to a suitable container and Charge-3 was added. The resulting ratio of NCO:OH was 1.2:1.0. Subsequently, the container was placed on a roller mill rotating at 200 rpm for one hour. Afterwards, the solution was filtered through a 10 micron nylon filter and degassed under vacuum for about 5 minutes.

EXAMPLE 3

The procedure of Example 2 was followed except that 5.66 grams of the polyacrylic polyol of Composition B were used.

EXAMPLE 4

The procedure of Example 2 was followed except that 6.07 grams of the polyacrylic polyol of Composition C was used.

EXAMPLE 5

The procedure of Example 2 was followed except that 5.53 grams of the polyacrylic polyol of Composition D was used.

EXAMPLE 6

The procedure of Example 2 was followed except that TINUVIN 144, a hindered amine UV stabilizer, was used in place of TINUVIN 292. Two solutions were prepared with the materials and amounts listed below:

Solution No. 1

| Material | Weight (grams) |
|---|---|
| Charge-1 | |
| Photochromic No. 1 | 2.83 |
| Photochromic No. 2 | 1.89 |
| TINUVIN 144 UV stabilizer | 1.15 |
| BAYSILONE paint additive PL | 0.06 |
| Tin catalyst | 0.43 |
| NMP | 19.68 |

| Material | Weight (grams) |
|---|---|
| Charge-2 | |
| QO POLYMEG 1000 diol | 27.0 |
| Charge-3 | |
| VESTANAT B 1356 A blocked polyisocyanate | 34.0 |

| Material | Weight (grams) |
|---|---|
| Charge-1 | |
| Photochromic No. 1 | 4.28 |
| Photochromic No. 2 | 2.86 |
| TINUVIN 144 UV stabilizer | 1.74 |
| BAYSILONE paint additive PL | 0.10 |
| Tin catalyst | 0.66 |
| NMP | 29.75 |
| Charge-2 | |
| Polyacrylic Polyol of Composition D | 37.96 |
| Charge-3 | |
| VESTANAT B 1358 A blocked polyisocyanate | 51.54 |

The amounts listed below, of Solution 1 and Solution 2 necessary to yield the listed weight ratio of polyacrylic polyol (P) to the QO POLYMEG 1000 diol (D), were added to a container suitable for use with a BRINKMAN PT-3000 homogenizer and were mixed for 2 minutes at 5000 rpm.

| Example No. | Ratio of P:D | Amount of Solution 2 (grams) | Amount of Solution 1 (grams) |
|---|---|---|---|
| 6A | 70:30 | 14 | 6 |
| 6B | 65:35 | 13 | 7 |
| 6C | 60:40 | 12 | 8 |
| 6D | 55:45 | 11 | 9 |
| 6E | 50:50 | 10 | 10 |
| 6F | 45:55 | 9 | 11 |
| 6G | 40:60 | 8 | 12 |

EXAMPLE 7

The following materials were added in the order listed to a container suitable for use with a BRINKMAN PT-3000 homogenizer.

| Material | Weight (grams) |
|---|---|
| Photochromic No. 1 | 2.02 |
| Photochromic No. 2 | 1.347 |
| TINUVIN 144 UV stabilizer | 0.819 |
| BAYSILONE paint additive PL | 0.045 |
| Tin catalyst | 0.309 |
| NMP | 14.025 |
| VESTANAT B 1358 A blocked polyisocyanate | 24.29 |

The contents in the container were mixed for 2 minutes at 5000 rpm and divided into aliquots of 3.67 grams. To each aliquot was added the amounts of polyol and diol listed below. The resulting solutions were mixed for 2 minutes at 5000 rpm and degassed under vacuum for about 15 minutes. The weight ratio of the polyol to the diol is 40:60. Each solution had an NCO:OH ratio of 1.2:1.0.

| | Composition D | |
|---|---|---|
| Example No. | Polyol (P) (grams) | Diol (D) (grams) |
| 7 | 0.45 | PEG(1000)[13] 0.67 |

[13] Polyethylene glycol having a number average molecular weight of 1000.

EXAMPLE 8

The following materials were added in the order listed to a container suitable for use with a BRINKMAN PT-3000 homogenizer.

| Material | Weight (grams) |
|---|---|
| Photochromic No. 1 | 8.076 |
| Photochromic No. 2 | 5.388 |
| TINUVIN 144 UV stabilizer | 3.276 |
| BAYSILONE paint additive PL | 0.18 |
| Tin catalyst | 1.236 |
| NMP | 56.1 |
| VESTANAT B 1358 A blocked polyisocyanate | 97.176 |

The contents in the container were mixed for 2 minutes at 5000 rpm and divided into aliquots of 14.86 grams. To each aliquot was added the amounts of polyol and diol listed below. The resulting solutions were mixed for 2 minutes at 5000 rpm and degassed under vacuum for about 15 minutes. The weight ratio of the polyol to the diol for each solution is 60:40 and the NCO:OH ratio is 1.2:1.0.

| | Composition D | |
|---|---|---|
| Example No. | Polyol (P) (grams) | Diol (D) (grams) |
| 8A | 3.699 | PPG(1000)[14] 2.466 |
| 8B | 3.697 | POTM(1000)[15] 2.465 |
| 8C | 4.231 | BPA(30)EO[16] 2.821 |

[14] Polypropylene glycol having a number average molecular weight of 1000.
[15] Poly(oxytetramethylene) diol having a number average molecular weight of 1000.
[16] Bisphenol A having approximately 30 ethylene oxide units and a number average molecular weight of 1500 which is available from PPG Industries, Inc.

EXAMPLE 9

The following materials were added in the order and manner described to a suitable vessel equipped with an agitator:

| Material | Weight (grams) |
|---|---|
| *Charge-1* | |
| Photochromic No. 1 | 2.691 |
| Photochromic No. 2 | 2.154 |
| Photochromic No. 3[17] | 0.538 |
| TINUVIN 144 UV stabilizer | 1.309 |
| BAYSILONE paint additive PL | 0.072 |
| Tin catalyst | 0.494 |
| NMP | 22.428 |
| *Charge-2* | |
| Polyacrylic polyol of Composition D | 17.175 |
| QO POLYMEG 1000 diol | 12.329 |
| *Charge-3* | |
| VESTANAT B 1358 A blocked polyisocyanate | 38.849 |
| *Charge-4* | |
| SILQUEST A-187[18] | 1.961 |

[17] A spironaphthoxazine which colors blue when irradiated with ultraviolet light.
[18] A γ-glycidoxypropyltrimethoxysilane available from OSi Specialties.

Charge-1 was added to the vessel, the agitator was turned on and the contents were mixed until the solids were dissolved. Charges 2, 3, and 4 were separately added and after each addition, the solution was mixed. The resulting solution was filtered through a 10 micron filter and degassed under vacuum for about 20 minutes.

EXAMPLE 10

The following materials were added in the order and manner described to a suitable vessel equipped with an agitator:

| Material | Weight (grams) |
|---|---|
| *Charge-1* | |
| Photochromic No. 1 | 0.44 |
| Photochromic No. 2 | 0.55 |
| Photochromic No. 3 | 0.11 |
| TINUVIN 144 UV stabilizer | 0.27 |
| NMP | 4.59 |
| *Charge-2* | |
| TMP-EO[19] | 0.9 |
| QO POLYMEG 1000 diol | 2.8 |
| VESTANAT B 1358 | 9.8 |
| BAYSILONE paint additive PL | 0.01 |
| SILQUEST A-187 | 0.41 |

[19] Trimethylolpropane having an average of 2.5 ethylene oxide units per hydroxyl group and a number average molecular weight of 450.

Charge-1 was added to the vessel, the agitator was turned on and the contents were mixed until the solids were dissolved. Charge-2 was added and the solution was mixed. The resulting solution was filtered through a 10 icron filter and degassed under vacuum for about 20 minutes.

COMPARATIVE EXAMPLE 1 (CE1)

The procedure of Example 6 was followed. The amounts listed below, of Solution 1 and Solution 2 necessary to yield the listed weight ratio of polyacrylic polyol to the QO POLYMEG 1000 diol, were added to a container suitable for use with a BRINKMAN PT-3000 homogenizer and were mixed for 2 minutes at 5000 rpm.

| Example No. | Ratio of P:D | Amount of Solution 2 (grams) | Amount of Solution 1 (grams) |
|---|---|---|---|
| CE1A | 80:20 | 16 | 4 |
| CE1B | 75:25 | 15 | 5 |

COMPARATIVE EXAMPLE 2 (CE2)

The following materials were added in the order listed to a container suitable for use with a BRINKMAN PT-3000 homogenizer.

| Material | Weight (grams) |
|---|---|
| Photochromic No. 1 | 8.749 |
| Photochromic No. 2 | 5.837 |
| TINUVIN 144 UV stabilizer | 3.549 |
| BAYSILONE paint additive PL | 0.195 |
| Tin catalyst | 1.339 |
| NMP | 60.775 |

The contents in the container were mixed for 2 minutes at 5000 rpm. Aliquots of 6.188 grams of the resulting solution were transferred to suitable containers. The amounts of the polyacrylic polyol of Composition D and the QO POLYMEG 1000 diol listed below were added to individual containers of the 6.188 grams of solution to yield the listed weight ratio of the polyacrylic polyol of Composition D to the QO POLYMEG 1000 diol.

| Example No. | Ratio of P:D | Amount of Polyacrylic polyol of Composition D (grams) | Amount of QO POLYMEG 1000 diol (grams) |
|---|---|---|---|
| CE2A | 100:0 | 5.964 | 0 |
| CE2B | 95:5 | 5.686 | 0.300 |
| CE2C | 90:10 | 5.407 | 0.600 |
| CE2D | 85:15 | 5.125 | 0.904 |
| CE2E | 25:75 | 1.576 | 4.728 |
| CE2F | 20:80 | 1.266 | 5.063 |
| CE2G | 15:85 | 0.953 | 5.400 |
| CE2H | 10:90 | 0.638 | 5.740 |
| CE2I | 5:95 | 0.320 | 6.082 |
| CE2J | 0:100 | 0 | 6.427 |

VESTANAT B 1358 A blocked polyisocyanate (8.098 grams) was added to each of the resulting solutions. The resulting ratio of NCO:OH was 1.2:1.0. Each solution was mixed using a BRINKMAN PT-3000 homogenizer for 2 minutes at 5000 rpm. The resulting solutions were transferred to suitable containers, filtered through a 10 micron nylon filter and degassed under vacuum for about 20 minutes.

COMPARATIVE EXAMPLE 3 (CE3)

The following materials were added in the order listed to a container suitable for use with a BRINKMAN PT-3000 homogenizer.

| Material | Weight (grams) |
| --- | --- |
| Photochromic No. 1 | 0.673 |
| Photochromic No. 2 | 0.449 |
| TINUVIN 144 UV stabilizer | 0.273 |
| BAYSILONE paint additive PL | 0.015 |
| Tin catalyst | 0.103 |
| NMP | 4.675 |
| Polyacrylic Polyol of Composition D | 2.190 |
| QO POLYMEG 1000 polyol | 4.060 |
| VESTANAT B 1358 A blocked polyisocyanate | 8.098 |

The contents in the container were mixed for 2 minutes at 5000 rpm. The resulting solution was filtered through a 10 micron nylon filter and degassed under vacuum for about 20 minutes. The resulting solution had a weight ratio of the polyacrylic polyol of Composition D to the QO POLYMEG 1000 diol of 35:65 and an NCO:OH ratio of 1.2:1.0.

COMPARATIVE EXAMPLE 4 (CE4)

The procedure of Comparative Example 3 was followed except that 1.89 grams of polyacrylic polyol of Composition D and 4.40 grams of QO POLYMEG 1000 diol were used. The resulting solution had a weight ratio of the polyacrylic polyol of Composition D to the QO POLYMEG 1000 diol of 30:70 and an NCO:OH ratio of 1.2:1.0.

COMPARATIVE EXAMPLE 5 (CE5)

The procedure of Comparative Example 2 was followed. To each aliquot was added the amounts of polyol and diol listed below.

| Comparative Example No. | Composition D Polyol (P) (grams) | Diol (D) (grams) | P:D ratio |
| --- | --- | --- | --- |
| 5A | 0.45 | PEG (600) [20] 0.67 | 40:60 |
| 5B | 0.43 | PPG (725) [21] 0.55 | 44:56 |
| 5C | 0.37 | POTM (650) [22] 0.51 | 42:58 |
| 5D | 0 | PCL (530) [23] 0.85 | 0:100 |
| 5E | 0.72 | PCL (1250) [24] 0.66 | 52:48 |

(20) Polyethylene glycol having a number average molecular weight of 600.
(21) Polypropylene glycol having a number average molecular weight of 725.
(22) Poly(oxytetramethylene) diol having a number average molecular weight of 650.
(23) Polycaprolactone diol having a number average molecular weight of 530.
(24) Polycaprolactone diol having a number average molecular weight of 1250.

EXAMPLE 11

Part A

The solutions prepared in Examples 2–5 were applied via a spincoating method to thermoplastic polycarbonate lenses that were previously coated with a non-tintable hardcoat by the supplier. The lenses were 76 millimeters in diameter and were obtained from Gentex Optics, Inc.; Orcolite, a division of Benson Eyecare Corp.; Vision-Ease, a unit of BMC Industries, Inc.; and/or SOLA Optical USA. Prior to application of the coating, each lens was immersed for 30 seconds in an aqueous potassium hydroxide solution having a normality of about 2.4, which was maintained at a temperature of 55° C., and then rinsed with deionized water. In some cases, the immersion and rinsing steps were conducted in a sonicator operating at a comparable power level as the Branson Ultrasonic Model 5200 sonicator described herein. Approximately 800 milligrams of solution was dispensed onto each lens that was spinning at 2000 rpm, which resulted in a wet film weight of approximately 200 milligrams per lens. The coated lenses were initially exposed to infrared light for a time sufficient to reduce the sticky nature of the coated lenses and then were cured for 40 minutes in a convection oven maintained at 140° C. The final thickness of the dried coatings were approximately 20 microns.

The solutions prepared in Examples 6–10 and Comparative Examples 1 through 5 were applied via a spincoating method to lenses made of CR-39® monomer. The lenses were 76 millimeters in diameter and were obtained from SOLA Optical USA. Prior to application of the coating, each lens (except those of Example 9) was immersed from 1 to 3 minutes in an aqueous potassium hydroxide solution having a normality of about 2.4 that was maintained at a temperature of 55° C. and then rinsed with deionized water. The immersion and rinsing steps were conducted in a Branson Ultrasonic Model 5200 sonicator. Approximately 800 milligrams of solution was dispensed onto each lens that was spinning at 2000 rpm, which resulted in a wet film weight of approximately 200 milligrams per lens. The coated lenses were cured for 40 minutes in a convection oven maintained at 140° C. The final thickness of the dried coating was approximately 20 microns. Lenses coated with the solution of Example 9 were separated into 2 groups, 9A and 9B. Both groups were coated as described above, but the lenses designated 9B were additionally coated with an organosilane-containing protective coating and cured. The thickness of the resulting hardcoat was 2 microns.

Part B

The photochromic coated lenses prepared in Part A were subjected to microhardness testing using a Fischerscope HCU, Model H-100 available from Fischer Technology, Inc. The microhardness, measured in Newtons per $mm^2$, of the coated lenses of Examples 2 through 5 was determined under the conditions of a 10 milliNewton load, 30 load steps and 0.5 second pauses between load steps. Microhardness testing for these samples was done before and after an IPA wipe, i.e., the lenses were wiped with an isopropanol soaked cloth 8 times forward and 8 times backward. Wiping with isopropanol before microhardness testing is done to determine the chemical resistance and structural integrity of the coating. The microhardness results for an acceptable coating tested before the IPA wipe should not differ by more than ±20 percent from the microhardness results of the same coating tested after the IPA wipe. Microhardness results after the IPA wipe outside of the acceptable range are indicative of coatings that absorb isopropanol, thereby effecting microhardness and coating integrity. Such a coating would be expected to have reduced chemical resistance and may not remain intact during further processing. Each lens was tested 3 times and the numerical average of those test results is listed in Table 1.

The microhardness of the coated lenses of Examples 7 through 10 and Comparative Example 5 was determined without an IPA wipe. Each lens was tested once under conditions of 300 milliNewton load, 30 load steps and 0.5 second pauses between load steps. Test results are listed in Table 2.

Part C

The photochromic coated lenses prepared in Part A were screened for ultraviolet absorbance and lenses having comparable UV absorbance at 390 nanometers were tested for photochromic response on an optical bench. Prior to testing on the optical bench, the photochromic lenses were exposed to 365 nanometer ultraviolet light for about 20 minutes to activate the photochromic compounds and then placed in a 75° C. oven for about 20 minutes to bleach (inactivate) the photochromic compounds. The coated lenses were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filter, which removes short wavelength radiation, neutral density filter(s), a water cell/sample holder having quartz windows for maintaining sample temperature in which the lens to be tested was inserted.

The power output of the optical bench, i.e., the dosage of light that the sample lens would be exposed to, was adjusted to 1.4 milliWatts per square centimeter ($mW/cm^2$) for Examples 2 through 5 and to 0.83 $mW/cm^2$ for Examples 6 through 10 and Comparative Examples 1 through 5. Measurement of the power output was made using a GRASEBY Optronics Model S-371 portable photometer (Serial #21536) with a UV-A detector (Serial # 22411) or comparable equipment. The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a photopic filter attached to a detector. The output signals from the detector were processed by a radiometer. The control of the test conditions and acquisition of data was handled by the Labtech Notebook Pro software and the recommended I/O board.

Change in optical density ($\Delta OD$) from the bleached state to the darkened state was determined by establishing the initial transmittance, opening the shutter from the Xenon lamp to provide ultraviolet radiation to change the test lens from the bleached state to an activated (i.e., darkened) state at selected intervals of time, measuring the transmittance in the activated state, and calculating the change in optical density according to the formula: $\Delta OD=\log(\%Tb/\%Ta)$, where %Tb is the percent transmittance in the bleached state, %Ta is the percent transmittance in the activated state and the logarithm is to the base 10.

The $\Delta OD$ was measured after the first sixteen (16) seconds of UV exposure and then after five (5) minutes in the 85° F. (29° C.) Photochromic Performance Test using the test parameters described hereinafter. Since a higher power output setting was used for determining the $\Delta OD$ at 85° F. for Examples 2 through 5, the data may be normalized to that of Examples 7 through 9 and Comparative Example 5 by dividing the 16 second results by 1.5 a nd the 5 minute results by 1.4. The Bleach Rate (T ½) is the time interval in seconds for the $\Delta OD$ of the activated form of the photochromic compound in the coated lenses to reach one half the highest $\Delta OD$ at 85° F. (29° C.) after removal of the source of activating light. Results for the photochromic coated lenses tested are listed in Table 3.

Part D

The microhardness testing described in Part B was performed on the coated lenses of Part A. Specifically, Example 6 and Comparative Examples 1 through 4 were tested with and without an IPA wipe under the conditions of a 300 milliNewton load, 30 load steps and 0.5 second pauses between load steps. The results are reported in Table 4 in decreasing order of the weight ratio of the polyacrylic polyol of Composition D to the QO POLYMEG 1000 diol.

The photochromic response testing described in Part C was conducted on the photochromic coated lenses of Part A, except that measurements were made when the optical bench temperature was 72° F. (22° C.) and 95° F. (35° C.) in the 72° F. and 95° F. Photochromic Performance Tests using the test parameters described hereinafter for each temperature. The power output of the optical bench was adjusted to 0.67 $mW/cm^2$ when the temperature was 72° F. (22° C.) and to 1.41 $mW/cm^2$ when the temperature was 95° F. (35° C.). The photochromic coated lenses were screened for ultraviolet absorbance and lenses having comparable UV absorbance were tested further. The ultraviolet absorbance value gives an indication of the amount of photochromic compounds in the coating on the lens. When the temperature of 72° F. (22° C.) was used, the lenses were activated for 30 minutes and the $\Delta OD$ was measured after the first 30 seconds and then after 30 minutes except for Example 10 which was measured after 15 minutes. When the temperature of 95° F. (35° C.) was used, the lenses were activated for 15 minutes and the $\Delta OD$ was measured after the first 30 seconds and then after 15 minutes. The results are reported in Table 5 in decreasing order of the weight ratio of the polyacrylic polyol of Composition D to the QO POLYMEG 1000 diol and in Table 6 for Examples 7 to 10 and Comparative Examples 5A to 5E.

TABLE 1

| Example No. | Microhardness Newtons per $mm^2$ (before IPA Wipe) | Microhardness Newtons per $mm^2$ (after IPA Wipe) |
| --- | --- | --- |
| 2 | 106 | 105 |
| 3 | 98 | 102 |
| 4 | 80 | 65 |
| 5 | 122 | 127 |

TABLE 2

| Example Number | Microhardness Newtons per $mm^2$ |
| --- | --- |
| 7 | 111 |
| 8A | 115 |
| 8B | 119 |
| 8C | 119 |
| 9A | 104 |
| CE5A | 115 |
| CE5B | 118 |
| CE5C | 126 |
| CE5D | 122 |
| CE5E | 126 |
| 10 | 110 |

TABLE 3

| Example No. | 85° F. ΔOD @ 16 (seconds) | 85° F. ΔOD @ 5 (minutes) | 85° F. (T ½) (seconds) |
|---|---|---|---|
| 2 | 0.27 | 0.48 | 28 |
| 3 | 0.27 | 0.49 | 28 |
| 4 | 0.29 | 0.51 | 27 |
| 5 | 0.26 | 0.50 | 28 |
| CE5A | 0.14 | 0.42 | 68 |
| 7 | 0.15 | 0.38 | 56 |
| CE5B | 0.11 | 0.37 | 78 |
| CE5C | 0.08 | 0.30 | 92 |
| CE5D | 0.09 | 0.35 | 76 |
| CE5E | 0.10 | 0.30 | 64 |
| 8A | 0.16 | 0.40 | 44 |
| 8B | 0.16 | 0.35 | 35 |
| 8C | 0.17 | 0.39 | 40 |
| 9A | 0.19 | 0.38 | 32 |
| 9B | 0.19 | 0.38 | 31 |

TABLE 4

| Example No. | Microhardness Newtons per mm$^2$ (before IPA Wipe) | Microhardness Newtons per mm$^2$ (after IPA Wipe) |
|---|---|---|
| CE2A | 213 | 218 |
| CE2B | 206 | 215 |
| CE2C | 174 | 180 |
| CE2D | 176 | 165 |
| CE1A | 184 | 197 |
| CE1B | 171 | 176 |
| 6A | 147 | 139 |
| 6B | 140 | 139 |
| 6C | 128 | 128 |
| 6D | 105 | 103 |
| 6E | 127 | 128 |
| 6F | 79 | 72 |
| 6G | 58 | 47 |
| CE3 | 30 | 8 |
| CE4 | 27 | 14 |
| CE2E | 13 | 8 |
| CE2F | 11 | 6 |
| CE2G | 8 | 7 |
| CE2H | 4 | 6 |
| CE2I | 6 | 6 |
| CE2J | 7 | 6 |

TABLE 5

| Example No. | 72° F. ΔOD@30 seconds | 72° F. ΔOD@30 minutes | 72° F. T ½ seconds | 95° F. ΔOD@30 seconds | 95° F. ΔOD@15 minutes | 95° F. T ½ seconds |
|---|---|---|---|---|---|---|
| CE2A | 0.03 | 0.23 | 3078 | 0.05 | 0.26 | 1019 |
| CE2B | 0.04 | 0.27 | 1998 | 0.07 | 0.30 | 576 |
| CE2C | 0.06 | 0.32 | 976 | 0.11 | 0.34 | 264 |
| CE2D | 0.08 | 0.37 | 646 | 0.13 | 0.37 | 176 |
| CE1A | 0.11 | 0.41 | 371 | 0.18 | 0.38 | 96 |
| CE1B | 0.13 | 0.44 | 226 | 0.21 | 0.39 | 56 |
| 6A | 0.19 | 0.48 | 118 | 0.27 | 0.41 | 30 |
| 6B | 0.19 | 0.48 | 113 | 0.27 | 0.40 | 29 |
| 6C | 0.22 | 0.49 | 94 | 0.29 | 0.41 | 24 |
| 6D | 0.24 | 0.50 | 76 | 0.31 | 0.41 | 20 |
| 6E | 0.20 | 0.48 | 100 | 0.29 | 0.40 | 27 |
| 6F | 0.28 | 0.50 | 58 | 0.34 | 0.41 | 16 |
| 6G | 0.30 | 0.51 | 50 | 0.37 | 0.42 | 14 |
| CE3 | 0.33 | 0.51 | 46 | 0.38 | 0.41 | 12 |
| CE4 | 0.34 | 0.51 | 41 | 0.37 | 0.41 | 12 |
| CE2E | 0.36 | 0.51 | 37 | 0.37 | 0.39 | 11 |
| CE2F | 0.36 | 0.51 | 35 | 0.36 | 0.39 | 10 |
| CE2G | 0.37 | 0.51 | 34 | 0.37 | 0.38 | 10 |
| CE2H | 0.38 | 0.49 | 31 | 0.36 | 0.38 | 10 |
| CE2I | 0.38 | 0.49 | 30 | 0.36 | 0.38 | 10 |
| CE2J | 0.38 | 0.49 | 30 | 0.36 | 0.38 | 10 |

TABLE 6

| Example No. | 72° F. ΔOD@30 seconds | 72° F. ΔOD@30 minutes | 72° F. T ½ seconds | 95° F. ΔOD@30 seconds | 95° F. ΔOD@15 minutes | 95° F. T ½ seconds |
|---|---|---|---|---|---|---|
| 7 | 0.19 | 0.53 | 192 | 0.28 | 0.43 | 44 |
| 8A | 0.17 | 0.47 | 137 | 0.30 | 0.45 | 29 |
| 8B | 0.20 | 0.46 | 96 | 0.27 | 0.39 | 24 |
| 8C | 0.21 | 0.53 | 128 | 0.30 | 0.42 | 28 |
| 9A | 0.23 | 0.49 | 83 | 0.30 | 0.40 | 21 |
| 9B | 0.23 | 0.48 | 81 | 0.30 | 0.40 | 20 |
| 10 | 0.19 | 0.52* | 78 | — | — | — |
| CE5A | 0.15 | 0.57 | 284 | 0.29 | 0.46 | 51 |
| CE5B | 0.13 | 0.52 | 292 | 0.24 | 0.45 | 52 |
| CE5C | 0.10 | 0.44 | 396 | 0.18 | 0.40 | 83 |
| CE5D | 0.10 | 0.49 | 338 | 0.22 | 0.44 | 46 |
| CE5E | 0.13 | 0.44 | 220 | 0.20 | 0.38 | 48 |

*ΔOD measured after 15 minutes

The results of Tables 1 and 2 show that the photochromic coated lenses prepared using the solutions of Examples 2 through 5, 7 through 10, and Comparative Examples 5A through 5E had acceptable microhardness. In Table 3, all of the lenses except those prepared with the solutions of Comparative Examples 5A through 5E demonstrated acceptable photochromic performance properties at 85° F. (29° C.), i.e., a ΔOD of at least 0.12 after 16 seconds and at least 0.30 after five minutes with a Bleach rate (T ½) of less than 60 seconds. Comparative Examples 5A through 5E were prepared using as the diol component, polyols and diols disclosed in the aforementioned prior art, i.e., U.S. Pat. No. 4,899,413 and Japanese Patent Applications 3-269507 and 5-28753.

The results of Tables 4 and 5 show that only the photochromic coated lenses prepared using the solutions of Examples 6A through 6G have microhardness results within the 2 desired range of 50 to 150 Newtons per mm$^2$ and acceptable photochromic performance results for 72° F. (22° C.) and 95° F. (35° C.), i.e., a ΔOD of at least 0.15 after 30 seconds and at least 0.44 after 30 minutes with a Bleach rate of less than 200 seconds, and a ΔOD of at least 0.25 after 30 seconds and at least 0.35 after fifteen minutes with a Bleach rate of less than 45 seconds, respectively. Comparative Examples 1 through 4 were prepared using weight ratios of the polyacrylic polyol of Composition D to the QO POLYMEG 1000 diol that did not yield coated lenses demonstrating either the desired Fischer microhardness and/or photochromic performance. In Table 6, all of the photochromic coated lenses except those of Comparative Examples 5A through 5E had acceptable photochromic performance results.

Although the present invention has been described with reference to the specific details of particular embodiments thereof, it is not intended that such details be regarded as limitations upon the scope of the invention except as and to the extent that they are included in the accompanying claims.

We claim:

1. An article comprising, in combination, a substrate and a polyurethane coating containing photochromic compound (s) on at least one surface of said substrate, said photochromic polyurethane coating being prepared from components comprising:

(a) an organic polyol comprising sections of hard and soft segment-producing polyols;

(b) an isocyanate, (c) photochromic compound(s) and (d) optional catalyst, the equivalent ratio of the NCO groups in the isocyanate component to the —OH groups in the organic polyol component ranging from 0.3:1 to 3:1, said components being used in such proportions to produce a photochromic polyurethane coating having a Fischer microhardness of from 50 to 150 Newtons per $mm^2$ as measured with a Fischerscope® H-100 using a 300 milliNewton load, 30 load steps and 0.5 second pauses and exhibiting a ΔOD of at least 0.15 after 30 seconds and at least 0.44 after 30 minutes, and a Bleach Rate of less than 200 seconds—all as measured in the 72° C. Photochromic Performance Test.

2. The article of claim 1 wherein said photochromic compound(s) is selected from the group consisting of naphthopyrans, benzopyrans, phenanthropyrans, indenonaphthopyrans, spiro(indoline)naphthoxazines, spiro(indoline)pyridobenzoxazines, spiro(benzindoline) pyridobenzoxazines, spiro(benzindoline)naphthoxazines, spiro(indoline)-benzoxazines, organo-metal dithizonates, fulgides, fulgimides and mixtures of such photochromic compounds.

3. The article of claim 1 wherein the Fisher microhardness of said coating is from 100 to 130 Newtons per $mm^2$, the ΔOD is at least 0.18 after 30 seconds and at least 0.46 after 30 minutes, and the Bleach rate is less than 150 seconds.

4. The article of claim 1 wherein said organic polyol is selected from the group consisting of low molecular weight polyols, polyester polyols, polyether polyols, amide-containing polyols, polyacrylic polyols, epoxy polyols, polyhydric polyvinyl alcohols, urethane polyols and mixtures of such polyols.

5. The article of claim 1 wherein said organic polyol component is a combination of:

(a) hard segment-producing organic polyol(s); and (b) soft segment-producing organic polyol(s).

6. The article of claim 5 wherein said hard segment-producing organic polyol is selected from the group consisting of polyacrylic polyols, low molecular weight polyols and mixtures of said polyols.

7. The article of claim 6 wherein said polyacrylic polyol is a copolymer of hydroxy-functional ethylenically unsaturated monomers and other ethylenically unsaturated monomers selected from the group consisting of vinyl aromatic monomers, vinyl aliphatic monomers, alkyl esters of (meth)acrylic acids, epoxy-functional monomers, carboxy-functional monomers and mixtures of such ethylenically unsaturated monomers and said low molecular weight polyol is an ethoxylated trimethylolpropane having a number average molecular weight less than 500.

8. The article of claim 5 wherein said soft segment-producing polyol is selected from the group consisting of polyether polyol, polyester polyol and mixtures of said polyols.

9. The article of claim 8 wherein said polyether polyol is selected from the group consisting of polyoxyalkylene polyols having a number average molecular weight of equal to or greater than 1,000, bisphenol A having approximately 30 ethoxy groups, poly(oxytetramethylene) diols having a number average molecular weight of 1000 and mixtures thereof.

10. The article of claim 1 wherein said isocyanate component is selected from the group consisting of aliphatic isocyanates, aromatic isocyanates, cycloaliphatic isocyanates, heterocyclic isocyanates and mixtures thereof.

11. The article of claim 1 wherein the equivalent ratio of the —NCO groups in the isocyanate component to the —OH groups in the polyol component ranges from 1.1:1 to 1.3:1.

12. The article of claim 10 wherein said isocyanate component is a blocked or modified isocyanate.

13. The article of claim 12 wherein said isocyanate component is selected from the group consisting of aliphatic isocyanates, cycloaliphatic isocyanates and mixtures thereof.

14. The article of claim 13 wherein said isocyanate component is selected from the group consisting of hexamethylene-1,6-diisocyanate, isophorone diisocyanate, ethylene diisocyanate, dodecane-1,12-diisocyanate, cyclohexane-1,3-diisocyanate and mixtures thereof.

15. The article of claim 14 wherein said isocyanate component is a blocked isocyanurate of isophorone diisocyanate.

16. The article of claim 15 wherein said blocked isocyanurate is blocked with a blocking compound selected from the group consisting of phenol, cresol, nonylphenol, epsilon-caprolactam and methyl ethyl ketoxime.

17. The article of claim 1 wherein a primer layer is interposed between the substrate and the polyurethane coating containing photochromic compound(s).

18. The article of claim 17 wherein said primer is a non-tintable hardcoat.

19. The article of claim 1 wherein said polyurethane coating containing photochromic compound(s) has a thickness of from 5 to 200 microns.

20. The article of claim 19 wherein said polyurethane coating containing photochromic compound(s) has a thickness of from 10 to 40 microns.

21. The article of claim 1 wherein said substrate is selected from the group consisting of paper, glass, ceramic, wood, masonry, textile, metal and organic polymeric materials.

22. The article of claim 21 wherein said organic polymeric material is selected from the group consisting of poly($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, polyethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, and diallylidene pentaerythritol monomers.

23. The article of claim 22 wherein the polymeric organic material is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane and polymers of members of the group consisting of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

24. The article of claim 23 wherein said substrate is an optical element.

25. The article of claim 24 wherein said optical element is a lens.

26. The article of claim 25 wherein the refractive index of said lens is from 1.48 to 1.75.

27. The article of claim 1 wherein a protective coating is applied to the surface of the photochromic polyurethane coating.

28. The article of claim 27 wherein said protective coating is a non-tintable hardcoat.

29. The article of claim 1 wherein a primer layer is interposed-between the substrate and the photochromic polyurethane coating and a protective coating is applied to the surface of said polyurethane coating.

30. An article comprising, in combination, a substrate of an organic polymeric material and a polyurethane coating containing photochromic compound(s) on at least one surface of said substrate, said photochromic polyurethane coating having a thickness of from 10 to 40 microns, and being prepared from components comprising:
    (a) photochromic compound(s);
    (b) organic polyol(s) comprising
        (i) hard segment-producing organic polyol(s) and
        (ii) soft segment-producing organic polyol(s);
    (c) an isocyanate; and
    (d) optionally catalyst;
the equivalent ratio of the —NCO groups in the isocyanate component to the —OH groups in the organic polyol component(s) ranging from 0.9:1.0 and 2.0:1.0, said components being used in such proportions to produce a photochromic polyurethane coating having a Fisher microhardness of from 50 to 150 Newtons per mm$^2$ as measured with a Fischerscope® H-100 using a 300 milliNewton load, 30 load steps and 0.5 second pauses and exhibiting a 72° F. ΔOD of at least 0.15 after 30 seconds and at least 0.44 after 30 minutes, and a Bleach rate of less than 200 seconds—all as measured in the 72° F. Photochromic Performance Test.

31. The article of claim 30 wherein said hard segment-producing organic polyol is selected from the group consisting of polyacrylic polyols, low molecular weight polyols and mixtures of said polyols.

32. The article of claim 31 wherein said polyacrylic polyol is a copolymer of hydroxy-functional ethylenically unsaturated monomers and other ethylenically unsaturated monomers selected from the group consisting of vinyl aromatic monomers, vinyl aliphatic monomers, alkyl esters of (meth)acrylic acids, epoxy-functional monomers, carboxy-functional monomers and mixtures of such ethylenically unsaturated monomers, and said low molecular weight polyol is an ethoxylated trimethylolpropane having a number average molecular weight less than 500.

33. The article of claim 30 wherein said soft segment-producing polyol is selected from the group consisting of polyether polyol, polyester polyol and mixtures of said polyols.

34. The article of claim 33 wherein said polyether polyol is selected from the group consisting of polyoxyalkylene polyols having a number average molecular weight of equal to or greater than 1,000, bisphenol A having approximately 30 ethoxy groups, poly(oxytetramethylene) diols having a number average molecular weight of 1000 and mixtures thereof.

35. The article of claim 30 wherein said isocyanate component is selected from the group consisting of hexamethylene-1,6-diisocyanate, isophorone diisocyanate, ethylene diisocyanate, dodecane-1,12-diisocyanate, cyclohexane-1,3-diisocyanate and mixtures thereof.

36. The article of claim 30 wherein said photochromic polyurethane coating has a thickness of from 10 to 25 microns.

37. The article of claim 36 wherein said organic polymeric material is selected from the group consisting of poly($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, and diallylidene pentaerythritol monomers.

38. The article of claim 37 wherein said substrate is an optical element.

* * * * *